United States Patent [19]
Cunningham

[11] 3,748,699
[45] July 31, 1973

[54] VARIABLE LENGTH V BELT

[76] Inventor: Byron H. Cunningham, 1013 Cedar St., Santa Cruz, Calif. 95060

[22] Filed: May 19, 1972

[21] Appl. No.: 254,884

[52] U.S. Cl. .......................... 24/38, 24/31, 74/231 J
[51] Int. Cl. ................................................ F16g 7/00
[58] Field of Search ................ 24/31 R, 31 B, 31 C, 24/31 L, 38, 20 EE, 206 A, 35, 16 PB, 230 B, 230 NP, 230 CF; 74/231 J

[56] References Cited
UNITED STATES PATENTS
1,326,264   12/1919   Hill ....................................... 24/38
3,092,885   6/1963   Gaunche ......................... 24/230 CF Primary Examiner—James T. McCall
Assistant Examiner—Kenneth J. Dorner
Attorney—Carl Hoppe, Robert G. Slick et al.

[57] ABSTRACT

A V belt is provided with a fastening means so that the belt can be cut to a desired length. The fastening means also enables one to install a belt in relatively inaccessible locations.

6 Claims, 8 Drawing Figures

PATENTED JUL 31 1973 3,748,699

VARIABLE LENGTH V BELT

SUMMARY OF THE INVENTION

Modern machinery employs V belts in many applications. For instance, in an ordinary automobile a number of belts are ordinarily employed of different lengths for operating the fan, generator, air conditioning, power steering, power brakes and the like. Since these belts vary in length and width, it is necessary for a service station or the like to stock a large number of belts to fit all of the different makes of cars. Even more variation is found in various types of industrial equipment for operating generators, air compressors and the like.

Not only is it necessary for an average shop to stock a large number of belts, but such belts are ordinarily of a continuous loop and are not readily installed in relatively inaccessible places. It is impossible to install such a belt unless an end of each of the pulleys is free. Thus, it is frequently necessary to disassemble various parts of the machinery when installing V belts and the disassembly and reassembly may cost many times the cost of the belt which is to be replaced.

In accordance with the present invention, a fastening means is provided on a V belt so that the belt can be placed around two pulleys, one or both of which may have obstructed ends and then fastened in place.

Another object of the invention is to provide a belt which can be readily cut to length to fit a wide variety of needs so that a service station or the like need carry only a relative few belts of varying widths and cut the belt to a desired length, depending upon the job at hand.

Still another object of the invention is to provide a V belt which can be readily fastened together, making a very secure joint which may or may not be held with cement or other adhesive or vulcanized in situ.

Other objects will be apparent from the balence of the specification.

BRIEF DESCRIPTION OF THE DRAWINGS

In the drawings forming part of this application.

DESCRIPTION OF THE PREFERRED EMBODIMENTS

Figure 3:
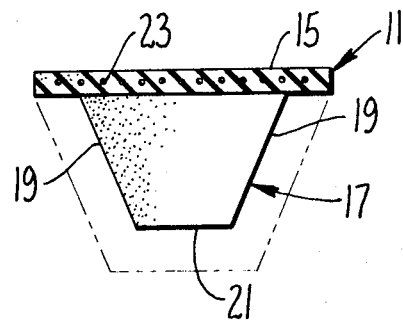
FIG. 3 is a section on the line 3—3 of FIG. 1.
Figure 5:
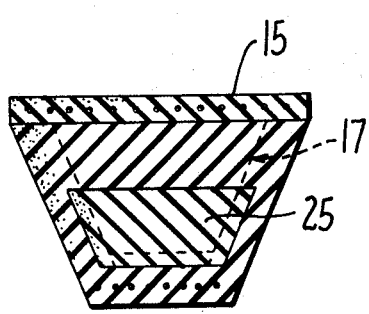
FIG. 5 is a section through a belt joint after it has been fastened.
Figure 4:
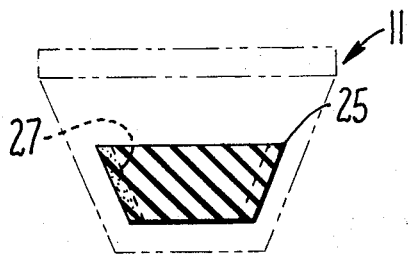
FIG. 4 is a section on the line 4—4 of FIG. 1.

Referring now to the drawings by reference characters, there is shown a fan belt of the V-type generally designated 9 having a male end 11 and a female end 13. End 11 has a tongue 15 on the top surface thereof which has a series of depending blades 17. The blades 17 may be of the same material as the belt or they may be made of plastic, rubber or similar materials. The preferred shape of the blades can best be seen in FIG. 3; each blade has angled sidewalls 19 and a flat bottom wall 21 so that the blade could be described as being in the form of an inverted truncated triangle. Obviously the blades need not have this exact shape but could be rectangular, have the bottom rounded or the like. The tongue portion 15 may be formed as an integral part of the belt having usual reinforcing cords 23 thereon which continue completely around the belt or the tongues may be made separately and attached to the balance of the belt.

Extending from the belt and spaced therefrom is a filler portion 25 which has a series of slots 27 formed therein. The slots 27 conform in size and shape to the ends of the blades 17 so that the bottom portion of the blades 17 form a snug fit with the slots 27. The filler 25 does not extend to the lower surface of the belt but is offset therefrom as at 31 and the purpose of this offset will be later apparent.

The opposite end of the belt 13 is formed with a central opening 33, which opening is complimentary to tongue 25 so that the tongue 25 will easily slide into opening 33. The top surface of the female end 13 is formed with a series of slots 35 and these correspond in size and spacing to the blades 17. Preferably the end of the female portion 13 is cut on a bevel as can best be seen in FIG. 6 on line 37 and the mating portions 31 and 39 of end 11 are cut at a complimentary angle.

In order to assemble a belt, it is only necessary to raise tongue 15, insert the filler 25 in opening 33 and bring the end 37 into position against the mating surfaces 31 and 39 and then push downwardly on tongue 15 so that the blades extend down through the slots 35 and into the mating slots 27. This locks the belt in place and for many applications the locking will be sufficient for use.

Under conditions of severe usage the parts may be coated with a cement such as a resin which will set after the parts are locked together. In accordance with one embodiment of the invention, before the parts are assembled they are coated with a rubber compound and then vulcanized in situ with a portable vulcanizing agent. Naturally other heat setting resins could be similarly employed. Before assembly with a resin or the like the parts should first be temporarily fitted together to make sure the belt is of the right length.

Figure 1:
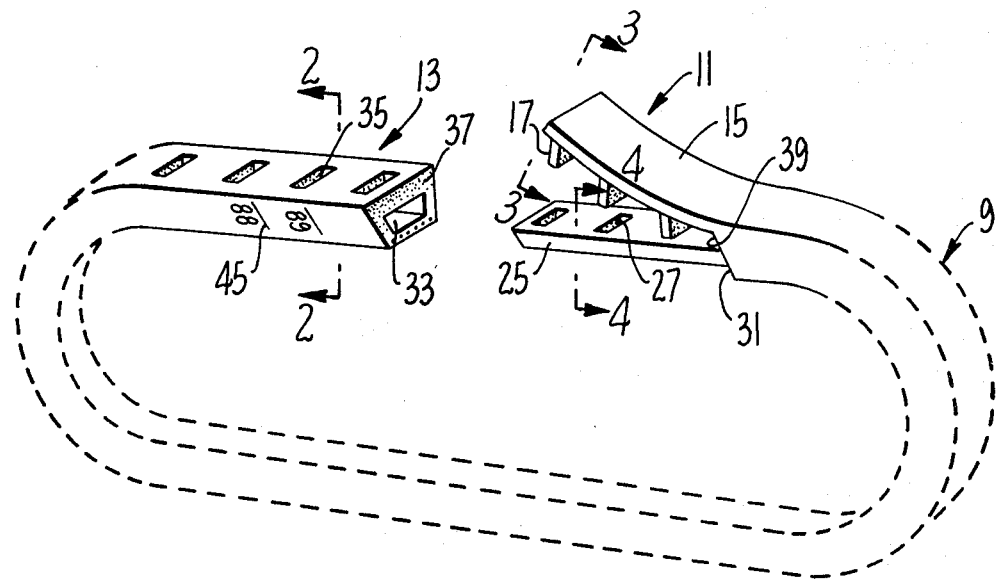
FIG. 1 is a perspective view of a belt embodying the present invention.
Figure 2:
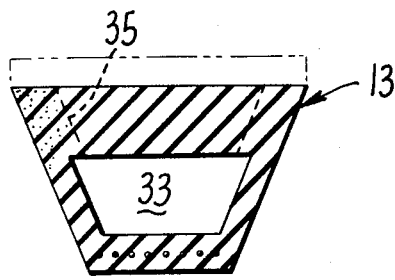
FIG. 2 is a section on the line 2—2 of FIG. 1.
Figure 7:
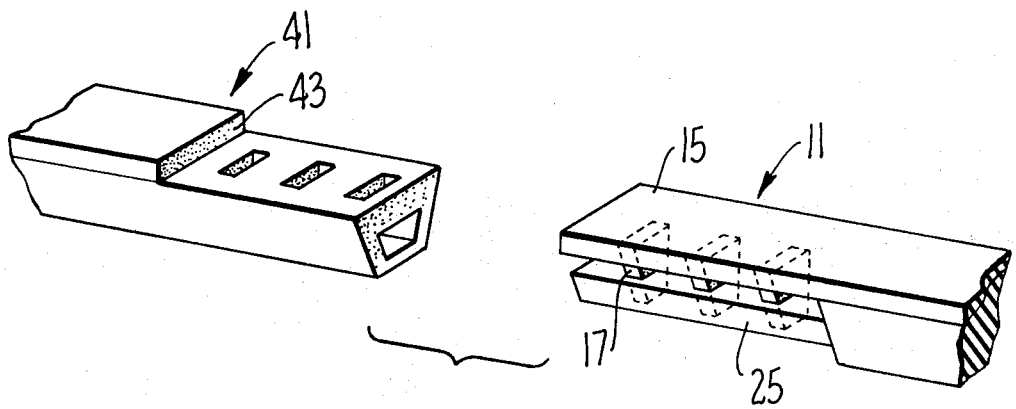
FIG. 7 illustrates another embodiment of the invention wherein a portion of the belt is recessed to provide a smooth outer surface after the belt is in place.
Figure 8:
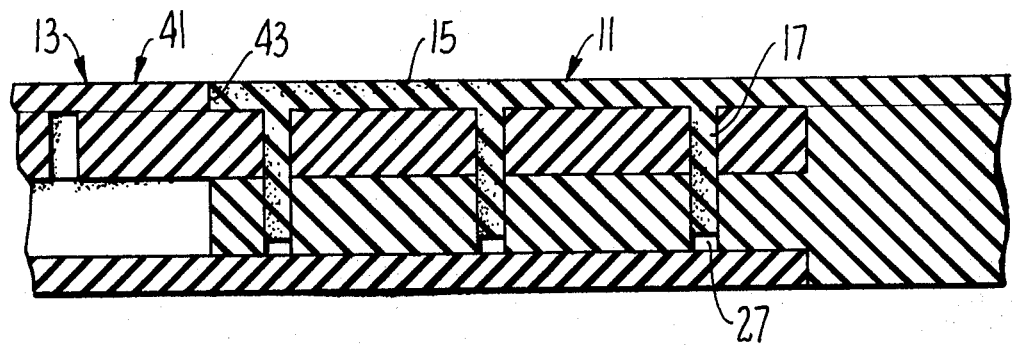
FIG. 8 is a section through a fastened belt joint made in accordance with the embodiment of FIG. 7.

In FIGS. 7 and 8 another embodiment of the invention is shown wherein the completed belt has a smooth outer surface. The male end 11 is exactly the same as previously described so that the same numbers are used. However, the female end has been modified and is generally designated 41. The structure is generally the same as is shown in FIG. 1 except that near the end of the belt, the upper surface is recessed as at 43, the amount of recessing being approximately equal to the thickness and length of tongue 15. When this belt is assembled as is shown in FIG. 8, a smooth outer surface is provided.

Many variations can be made in the belt without departing from the spirit of this invention. For instance, only three blades and mating slots have been shown but it is obvious that a fewer or larger number might be employed. The opening 33 as well as the slots 35 can extend for a considerable distance around the belt to provide maximum flexibility in cutting the belt to a desired length. The belt shown in FIG. 7 is less flexible with respect to length since here it is obvious that if one end is cut, the opposite end must be similarly cut to provide the proper mating of the outer surfaces.

Figure 6:
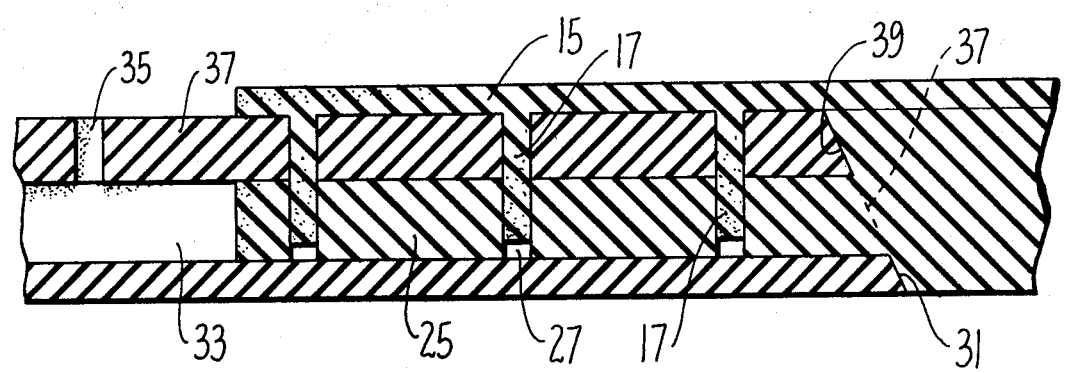
FIG. 6 is a side view of a belt joint formed in accordance with the present invention.

The belt of the present invention can be formed of a single piece, preferably of cord reinforced rubber or similar plastic or the belts may be formed in several pieces and assembled. For instance, the tongue could be made of one material, the blade of another and the whole assembled into the belt. Although the belt is normally cut at an acute angle as is best seen in FIG. 6, this is not necessary and the belts can be formed with square ends as is shown in FIG. 8.

For variable length belts, printing may be employed on the outer surface of the belt as is shown at 45 to indicate the point to cut for various lengths. Such markings could be easily molded into the belt. In order to give maximum strength to the belt, it is preferred that the cross sectional areas of the actual material of the belt be about the same for both ends of the belt. The thickness of the material may be slightly thinned down in the overlapping area so that the balance of the belt can be maintained, particularly with the embodiment shown in FIG. 1.

Although reference has been made to a variable length fan belt which can be cut to length, it is obvious that the fastening method of the present invention is highly advantageous even with belts of fixed lengths, since such belts can be installed in relatively inaccessible places without the necessity of disassembling machinery.

It is believed obvious from the foregoing that I have provided an improved form of belting which can be cut to accommodate a variety of lengths and which can be installed in relatively inaccessible locations on machinery.

I claim:

1. A belt of the V-type having fastening means comprising in combination:
    a. a belt with a male end having a tongue extending therefrom and generally forming a continuation of the outer surface of the belt,
    b. a series of blades attached to and extending downwardly from said tongue,
    c. a filler strip underlying said tongue and spaced therefrom,
    d. a series of slots in said filler strip corresponding in location and spacing to said blades,
    e. a female end on said belt, said belt having an opening therein lying generally parallel with said belt and being complimentary to said filler,
    f. a series of slots though the top surface of said female end of the belt extending through the top surface and into said opening, said slots corresponding in size and spacing to the blades of said tongue, and
    g. whereby said filler strip can be inserted in said opening and said tongue brought over the female end of said belt and the blades inserted through the opening in said female end and extending into the opening in said filler strip whereby said belt is locked together.

2. The belt of claim 1 wherein at least one end of said belt is adapted for cutting off, whereby a belt of shorter length can be made while preserving fastening means.

3. The belt of claim 2 wherein indicia are provided on said belt to indicate the point for cutting the belt to provide a belt of desired length.

4. The belt of claim 1 wherein said ends are additionally fastened with a cement.

5. The belt of claim 1 wherein the top surface of the female end is recessed to form a complement to said tongue whereby a fastened belt has a smooth outer surface.

6. The belt of claim 1 wherein the blades are in the form of an inverted truncated triangle.

* * * * *